United States Patent [19]

Shinozaki

[11] Patent Number: 4,985,840

[45] Date of Patent: Jan. 15, 1991

[54] ARBITRARILY SHAPED WORKPIECE MACHINING METHOD

[75] Inventor: Satoru Shinozaki, Shimodate, Japan

[73] Assignee: Fanuc Ltd., Minamitsuru, Japan

[21] Appl. No.: 350,741

[22] PCT Filed: Sep. 14, 1988

[86] PCT No.: PCT/JP88/00939

§ 371 Date: Apr. 27, 1989

§ 102(e) Date: Apr. 27, 1989

[87] PCT Pub. No.: WO89/03070

PCT Pub. Date: Apr. 6, 1989

[30] Foreign Application Priority Data

Sep. 22, 1987 [JP] Japan .................................. 62-238127

[51] Int. Cl.$^5$ .......................................... G05B 19/403
[52] U.S. Cl. .................. 364/474.29; 364/191
[58] Field of Search ........... 364/474.29, 474.2, 474.18, 364/474.32, 474.35, 474.33, 474.24, 191–193; 318/569, 572, 571, 578, 579, 568.1

[56] References Cited

U.S. PATENT DOCUMENTS

| | | | |
|---|---|---|---|
| 4,706,200 | 11/1987 | Kishi et al. | 364/474.29 |
| 4,739,489 | 4/1988 | Kishi et al. | 364/474.29 |
| 4,745,558 | 5/1988 | Kishi et al. | 364/474.29 |

Primary Examiner—Joseph Ruggiero
Attorney, Agent, or Firm—Staas & Halsey

[57] ABSTRACT

An arbitrarily shaped workpiece machining method of machining a workpiece having arbitrarily shaped machining portions defined by closed curves of a pond, an island and the like is disclosed, wherein boundary meshes (9a, 9b) having center lines through which a contour passes are created, and the arbitrarily shaped workpiece is machined by horizontally machining portions between the boundary meshes (9a, 9b).

With the above arrangement, the arbitrarily shaped workpiece can be machined without the need for an automatic program creation device or the like.

3 Claims, 4 Drawing Sheets

ARBITRARILY SHAPED WORKPIECE MACHINING METHOD

TECHNICAL FIELD

The present invention relates to an arbitrarily shaped workpiece machining method of machining an arbitrarily shaped workpiece defined by closed curves such as a pond shape, an island shape and the like, and more specifically, to an arbitrarily shaped workpiece machining method whereby the machining of the arbitrarily shaped workpiece is simplified.

BACKGROUND ART

When a numerically controlled machine tool carries out a complicated machining of a workpiece, such as the machining of a pond shape, machining leaving an island shape projection, machining leaving an island shape projection in a pond shape and the like, this machining process requires not only the machining of a pond shape or an island shape but also a cutting between contours. For example, when an island shape projection is to be left in a pond, not only the inside wall contour of the pond but also the interior of the pond except for the island portion must be cut Conventionally, an overall machining process for these portions is programmed manually or by using an automatic program creation device or the like, but such a manual programming of complicated shapes is time-consuming and prone to a very high error rate. Further, the automatic program creation device is expensive, it is difficult to use the device for correcting a program during machining, and the creation of a machining program requires a high degree of skill.

DISCLOSURE OF THE INVENTION

An object of the present invention is to solve the above problems and to provide an arbitrarily shaped workpiece machining method capable of simplifying the machining of a complicated arbitrarily shaped workpiece by a numerical control apparatus.

To solve the above problems, according to the present invention, there is provided an arbitrarily shaped workpiece machining method of machining a workpiece having arbitrarily shaped machining portions defined by closed curves of a pond shape, an island shape and the like, comprising the steps of:

forming meshes on the arbitrarily shaped portions;
machining contours of the closed curves;
creating boundary meshes having center lines through which the contours pass; and
horizontally or vertically machining portions between said boundary meshes to thereby machine the arbitrarily shaped portions defined by the closed curves.

An arbitrarily shaped workpiece having an island shape projection in the middle of a pond shape will be described as an example.

First, a slot is cut along the inside wall of the pond shape by an end mill or the like, and then a slot is cut along the outside wall of the island shape. At the same time, when the passages along the inside wall of the pond shape and the outside wall of the island shape are machined (machining of the slots) meshes having center lines through which the center locus of the end mill passes are stored as boundary meshes.

Then, portions between the boundary meshes are machined and a remaining portion is cut and removed.

BEST MODE OF CARRYING OUT THE INVENTION

Figure 2A:
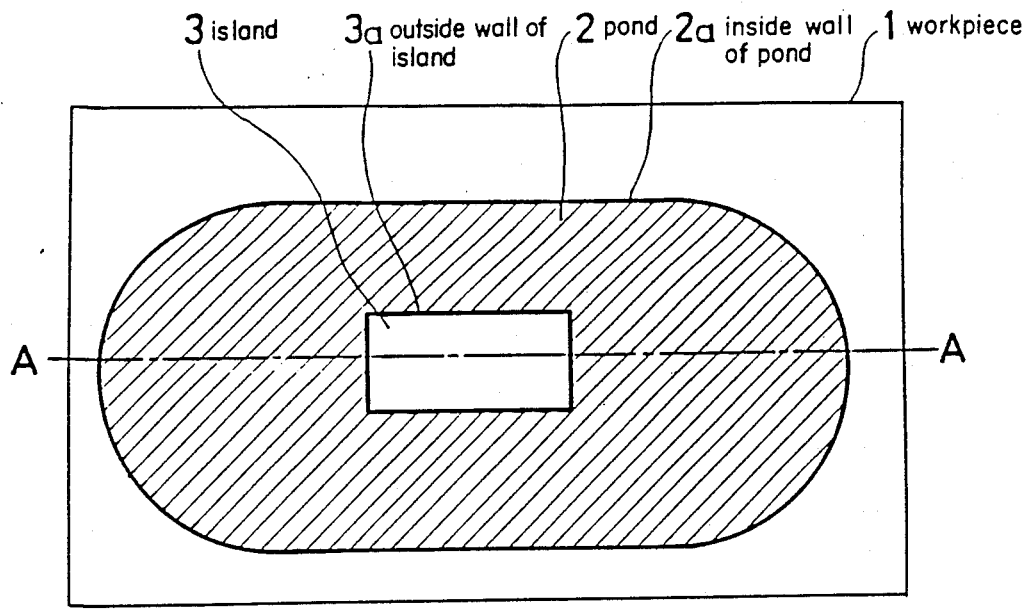
FIG. 2(a) is a plan view of a workpiece to be machined.
Figure 2B:
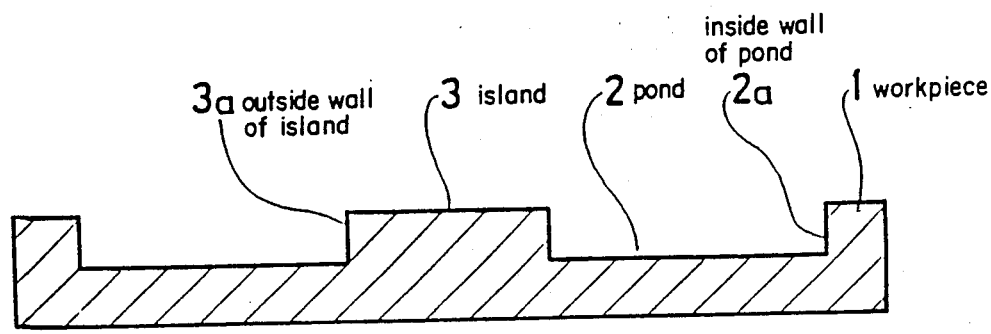
FIG. 2(b) is a cross-sectional view taken along the line A—A of FIG. 2(a)

An embodiment of the present invention will be hereinafter described with reference to the drawings FIG. 2(a) is a plan view of a workpiece to be machined and FIG. 2(b) is a cross-sectional view taken along the line A—A of FIG. 2(a), wherein 1 designates a workpiece to be machined, 2 designates a pond shape machined portion, 2a designates the inside wall of the pond shape 2, 3 designates an island shape projection in the middle of the pond shape 2, and 3a designates the outside wall of the island shape 3. Note, FIG. 2(b) is a diagram of the workpiece after the machining is finished.

Figure 1A:
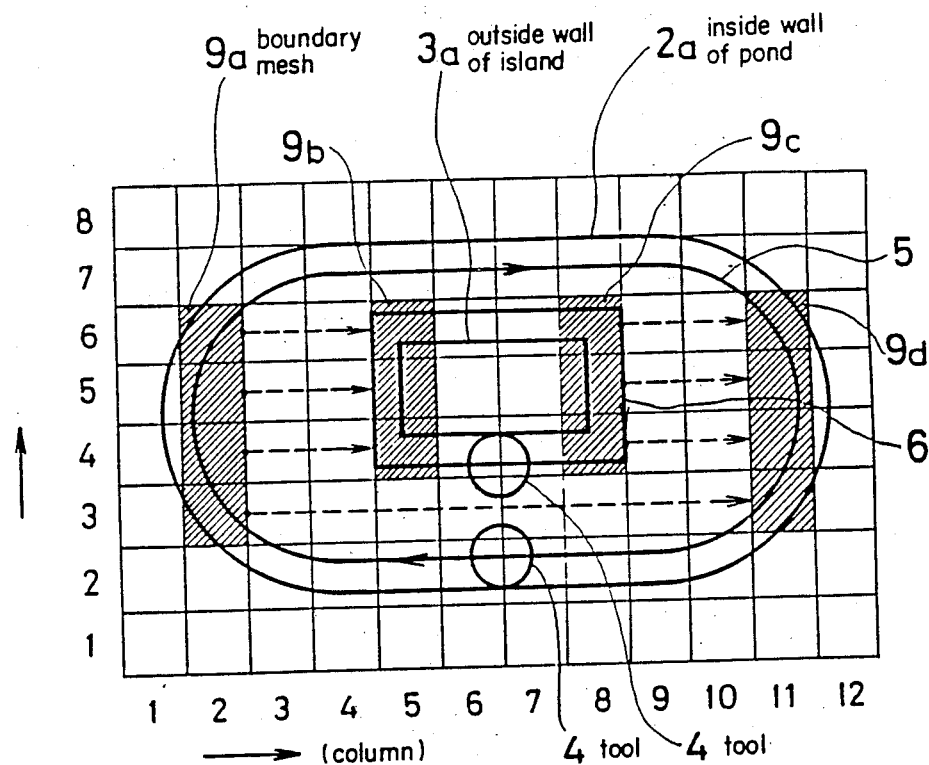
FIG. 1(a) is a diagram of meshes for creating a machining program.

Next, the machining method will be described. FIG. 1(a) is a diagram of meshes for creating a machining program. Namely, as shown in FIG. 1(a), a drawing of the workpiece 1 to be machined is illustrated on the meshes. Portions in FIG. 1(a) which are identical to those shown in FIGS. 2(a) and 2(b) are designated by identical reference characters and thus a description thereof is omitted In FIG. 1(a), 4 designates a tool as an end mill, viewed from above, 5 designates a locus through which the center of the tool 4 passes when the inside wall 2a of the pond is machined, and 6 designates a locus through which the center of the tool 4 passes when the outside wall 3a of the island is machined.

Figure 1B:
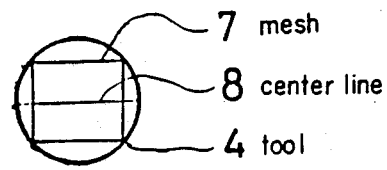
FIG. 1(b) is a diagram of a mesh and a center line thereof.

Note, the mesh is a square circumscribed by the outline of the tool 4, as shown in FIG. 1(b), wherein 4 designates an outside shape of the tool, 7 designates a size of a single mesh, and 8 designates a center line of the mesh.

Returning to FIG. 1(a), when the loci 5 and 6 cross the center lines of meshes, the meshes are referred to as boundary meshes as shown by hatching. When these boundary meshes are determined and portions therebetween are cut and removed, a portion remaining after machining the inside wall 2a of the pond and the outside wall 3a of the island can be cut and removed.

Figure 3:
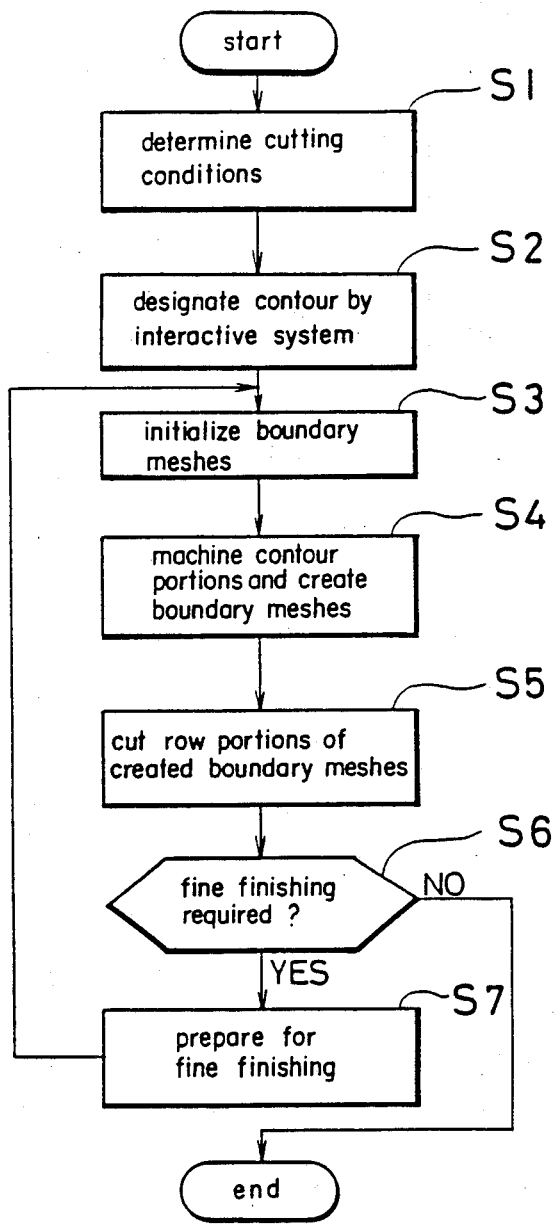
FIG. 3 is a flowchart of the machining process.

Next, the actual machining process will be described. FIG. 3 is a flowchart of the machining process, wherein numerals prefixed with an "S" indicate the numbers of steps of the process.

Figure 4:
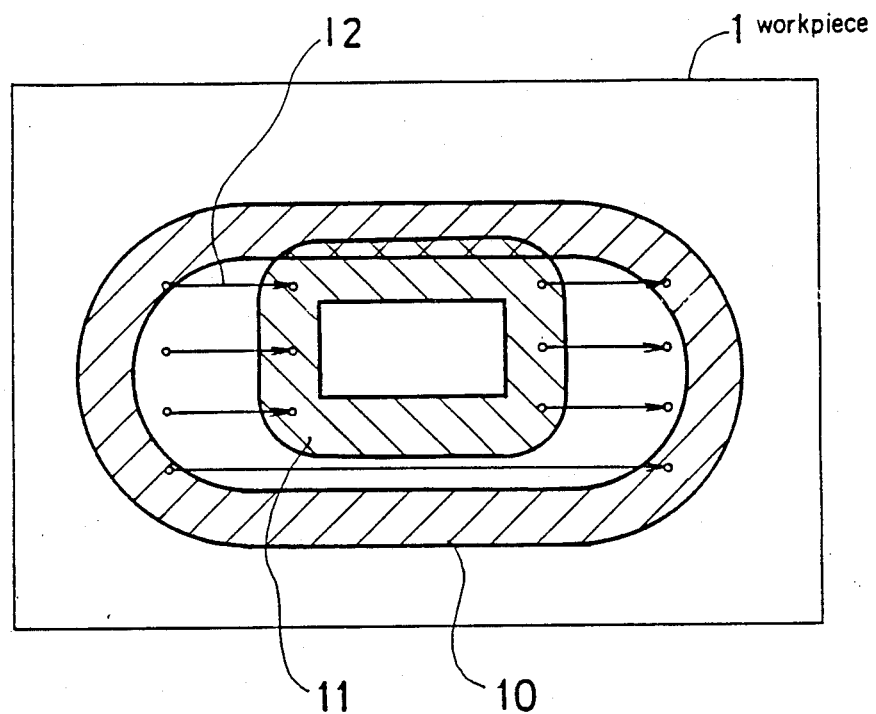
FIG. 4 is a diagram of the machining of the inside wall of a pond and the outside wall of an island

The cutting conditions such as cutting speed, RPM of a spindle and the like are determined at step S1. These cutting conditions are determined by an interactive system of a numerical control apparatus. The flow then goes to step S2, where contours are designated by the interactive system. In the example shown in FIG. 1(a), the contour 5 for machining the inside wall 2a of the pond and the contour 6 for machining the outside wall 3a of the island are designated. Note, the programmer can designate the contours while monitoring a display at the numerical control apparatus. At step S3, meshes are drawn over a machining shape, as shown in FIG. 1(a). As described above, each mesh is a square circumscribed by the outer shape of the tool. In FIG. 1(a), 8 rows×12 columns of meshes are drawn, and these meshes are automatically created in the numerical control apparatus. At step S4, the contour portions, i.e., the inside wall 2a of the pond and the outside wall 3a of the island are machined, as shown in FIG. 4, wherein 1 designates a workpiece, 10 designates a machined portion of the inside wall 2a of the pond, and 11 designates a machined portion of the outside wall 3a of the island. After this machining, only a portion 12 between the machined portion 10 and the machined portion 11 remains.

At the same time, meshes having center lines 8 through which the center loci 5 and 6 of the tool 4 pass are stored as boundary meshes 9a, 9b, 9c and 9d. FIG. 1(a) shows the boundary meshes 9a–9d as hatched squares. The flow then goes to step S5, where the tool is moved in such a manner that the boundary mesh 9a is combined with the boundary mesh 9b or the boundary mesh 9c is combined with the boundary mesh 9d in the same row, as shown by dotted lines in FIG. 1(a). If there is no boundary mesh in a row, machining is not effected, and accordingly, all of the rows in which boundary meshes exist are machined. When four or more boundary meshes exist in a row, as in the sixth row in FIG. 1(a), the boundary meshes are numbered sequentially, and only portions between the odd numbers and even numbers are machined. At step S6, it is determined if fine finishing is required. If fine finishing is not required, the process is ended. Alternatively, if fine finishing is required, the flow goes to step S7 and the tool is exchanged for a finishing tool, and the flow goes to step S3 to effect the fine finishing in the same manner as for a rough finish.

With the above arrangement, the machining of a workpiece having arbitrarily shaped machining portions defined by the closed curves of the pond, the island and the like is simplified.

In the above description, although a workpiece having a machining shape defined by the closed curves of a pond and an island is described, any workpiece having a machining shape defined by closed curves of a peninsula shape or a cape shape and the like, or any workpiece having an island in a pond, and further, a pond in the island, can be machined.

Further, although the description is made with respect to the horizontal machining of a workpiece, the machining can also be carried out vertically, although in this case the center lines of the boundary meshes must be vertical.

Furthermore, although in the above description the boundary meshes are discriminated and stored during the machining, a machining program may be created without actually carrying out the machining, by virtually distributing pulses without machining contours and determining boundary meshes.

According to the present invention, as described above, since an arbitrarily shaped workpiece having arbitrarily shaped machining portions defined by closed curves of a pond, an island and the like are cut and removed, except for portions thereof having contours which are machined by determining boundary meshes of the workpiece, it is not necessary to program machining passages other than those for the contours. As a result, a workpiece having complicated closed curves can be easily machined by a numerical control apparatus, and a special device such as an automatic program creation device or the like is not required.

I claim:

1. An arbitrarily shaped workpiece machining method of machining a workpiece having arbitrarily shaped machining portions defined by closed curves of a pond shape, an island shape and the like, comprising the steps of:
   forming meshes on said arbitrarily shaped portions;
   machining contours of said closed curves;
   creating boundary meshes having center lines through which said contours pass; and
   horizontally or vertically machining portions between said boundary meshes to thereby machine said arbitrarily shaped portions defined by the closed curves.

2. An arbitrarily shaped portions machining method according to claim 1, wherein said meshes are squares circumscribed by an outline of a tool.

3. An arbitrarily shaped workpiece machining method according to claim 1, wherein numbers are given to said boundary meshes and only portions between odd numbers and even numbers are machined.

* * * * *